No. 865,831. PATENTED SEPT. 10, 1907.
J. N. WALKER.
COMBINED LEVEL AND PLUMB.
APPLICATION FILED JUNE 1, 1907.
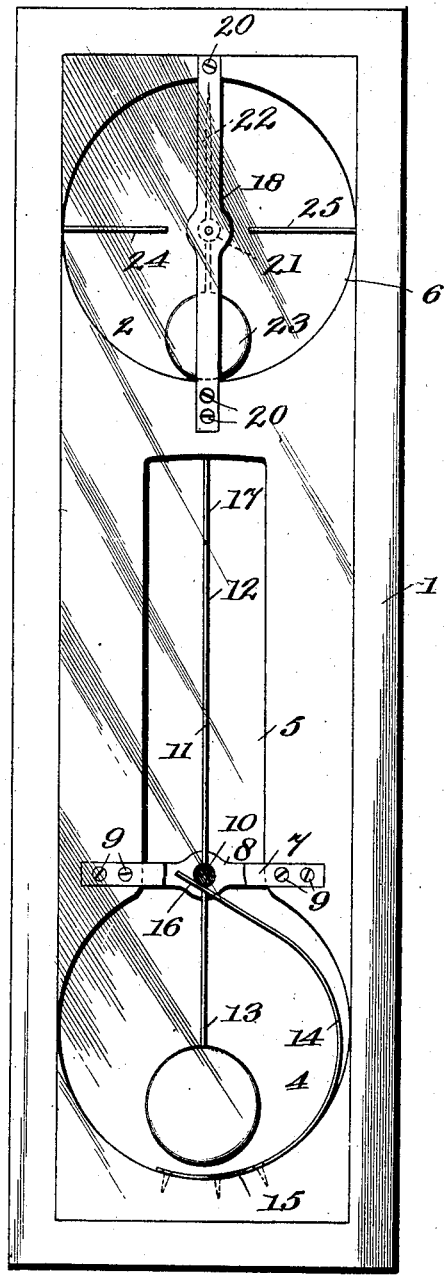
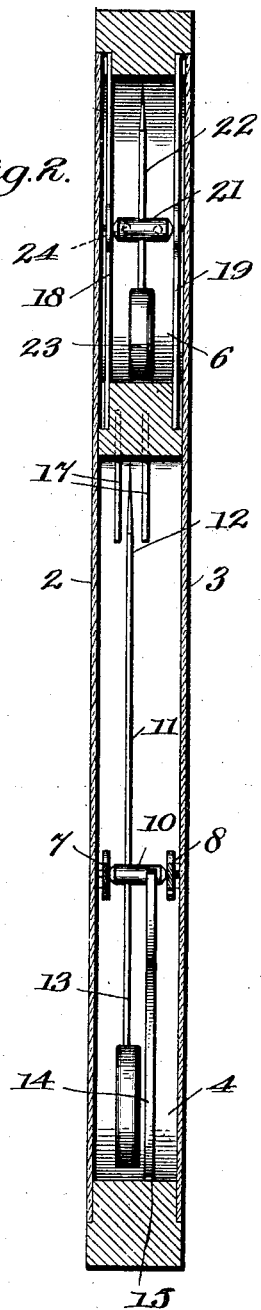
Witnesses
Geo. H. Byrne.
A. W. Neale, Jr.
Inventor
Jasper N. Walker.
by Wilkinson, Fisher and Witherspoon
Attorneys

UNITED STATES PATENT OFFICE.

JASPER N. WALKER, OF MARION, ILLINOIS.

COMBINED LEVEL AND PLUMB.

No. 865,831.            Specification of Letters Patent.          Patented Sept. 10, 1907.

Application filed June 1, 1907. Serial No. 376,805.

*To all whom it may concern:*

Be it known that I, JASPER N. WALKER, a citizen of the United States, residing at Marion, in the county of Williamson and State of Illinois, have invented certain new and useful Improvements in a Combined Level and Plumb; and I do hereby declare the following to be a full, clear, and exact description of the invention, such as will enable others skilled in the art to which it appertains to make and use the same.

My invention relates to combination level and plumb for various uses adapted by those of the trade, and has for its object an inexpensive instrument of this character which can easily and quickly be read from either side, and one wherein the leveling and plumb members can in no possible way become unadjusted.

A further object is to provide a means whereby the quick stopping of the needle may be effected.

With these and other objects in view, my invention comprises the novel features of construction and combinations of parts more fully described, and pointed out in the claims.

In the accompanying drawings;—Figure 1 is a side elevation of my combination instrument. Fig. 2 is a longitudinal section of the same.

Referring now to the drawings forming a part of this specification, 1 designates the beam of the instrument which is cut away at its sides to form recesses to receive plates of glass 2 and 3, which are cemented or otherwise secured therein. A circular opening 4 is cut entirely through the beam which communicates with a similar elongated opening 5, and in this opening is mounted the working parts of my plumb. Adjacent the opening 5 a circular opening 6 is cut to receive the working parts of my level.

7 and 8 represent bearing plates which are countersunk into the sides of the beam 1 and are securely held by screws 9. These plates have central alining perforations to receive the reduced ends of the spindle 10 of an indicator through which passes the wire 11 on one end of which is the indexing needle 12 and the other the pendulum 13.

In the opening 4 I have mounted a flat spring, one end 15 of which is securely held against lateral movement while the other end 16 bears against the periphery of the spindle 10 thereby causing the quick stopping of the indicator.

17—17 are gage wires which are inserted in the beam 1 of the instrument at one end of the elongated opening 5 and in a direct vertical line from the axis of the indicator. When this instrument is used as a plumb, it may be seen that when it is true, through the action of the pendulum the indexing needle 12 will be directly between the gage wires 17.

In order that the instrument may be used as a level, I mount a somewhat similar arrangement in the circular opening 6, as that just previously described.

Mounted in the bearing plates 18 and 19 which are countersunk in the beam 1 and held by screws 20, is a spindle 21, the reduced ends of which are held in central alining perforations in the bearing plates 18 and 19. Through the spindle 21, passes a shorter wire than the one previously described, on one end of which is the indicating needle 22 and on the other end the pendulum 23. I have provided for a double reading of this level, and when it is used from either side the indexing finger 22 will register with gage wires 24 or 25, which are mounted in the beam 1 and in a line at right angles to the leveling edges.

In using the instrument as a plumb, one end of the beam is brought into play for determining the plumb of the wall it being observed that any variations will quickly be shown by the indicator not registering with the gage wires. The friction caused by the spring bearing on the periphery of the spindle of the indicator will quickly cause the same to come to a stop thereby getting a quick result which can be read from either side.

When the instrument is used as level, the operation is essentially as that described, and any deflections may be quickly determined.

It will of course be understood that I do not limit myself to the exact construction shown and any variations from the specific construction may be altered without departing from the spirit of my invention.

By the arrangement of the instrument above described, it may be readily seen that I have provided an instrument that is in no way complicated and one that can be manufactured cheap, and that is accurate and can be easily read and in no way effected by the condition of the weather.

Having thus described my invention, what I claim as new and desire to secure by Letters Patent is:—

1. In a combined level and plumb, the combination of a beam, glass panels for the same, a pendulum provided with an indicating needle, a pair of gage wires coöperating with said indicating needle, a pair of bearing plates for supporting said pendulum, a second pendulum constituting a level and also provided with an indicating needle, and gage wires 24 and 25 coöperating with the indicating needle of said second pendulum whereby a double reading of said level is provided, and the whole is adapted for either a plumb or a level, substantially as described.

2. In a combined level and plumb, the combination of a beam, provided with a circular and an elongated opening, glass panels for the same, a pendulum located in said openings and provided with an indicating needle, a pair of gage wires located in said elongated opening and coöperating with said indicating needle, a pair of bearing plates for supporting said pendulum, said beam also provided with a second circular opening, a second pendulum constituting a level mounted in said second opening and provided with an indicating needle, a pair of plates supporting said second pendulum, and gage wires in said second circular opening at opposite sides of the said beam and coöperating with the indicating needle of said second pendulum, whereby a double reading of said level is provided, and the whole is adapted for either a plumb or a level, substantially as described.

3. In a combined level and plumb, the combination of a beam, provided with leveling or plumb edges, and a circular and an elongated opening, glass panels for the same, a pendulum provided with an indicating needle located in the said openings, a pair of gage wires located in said elongated openings and coöperating with said indicating needle, a pair of bearing plates for supporting said pendulum, said beam also provided with a second circular opening, a second pendulum constituting a level mounted in said second opening and provided with an indicating needle, a pair of plates supporting said second pendulum, and gage wires 24 and 25 located at right angles to the said leveling edges whereby a double reading of said level is provided and the whole is adapted for either a plumb or a level, substantially as described.

4. In a combined level and plumb, the combination of a beam, provided with leveling or plumb edges, and a circular and an elongated opening extending transversely therethrough and communicating with each other, glass panels for the same, a pendulum provided with a spindle, and an indicating needle, said pendulum and said needle located in said openings, a spring, one end of which is securely held in the circular opening and the other or free end of which bears against the periphery of said spindle and thereby frictionally retards the swinging of said pendulum and causes the same to come to a stop and to perform its functions more quickly than it would otherwise do, a pair of gage wires located in said elongated opening and coöperating with said indicating needle, a pair of bearing plates for supporting said pendulum, said beam also provided with a second circular opening, a second pendulum constituting a level mounted in said second opening and provided with an indicating needle, a pair of plates supporting said second pendulum, and gage wires 24 and 25 located at right angles to the said leveling edges, whereby a double reading of said level is provided and the whole is adapted for either a plumb or a level, substantially as described.

5. In a combined level and plumb, the combination of a beam provided with leveling and plumb edges, and a circular and an elongated opening extending transversely therethrough and communicating with each other, and said beam also provided with cut away sides, glass panels for the same secured in said cut away sides and made flush with said beam, a pendulum provided with a spindle having reduced bearing ends, and with an indicating needle, said pendulum and needle being attached nearer one end of said spindle than to the other, said pendulum and said indicating needle being located in said openings, a spring, one end of which is securely held in the circular opening at one side of said pendulum and the other or free end of which bears against the periphery of said spindle to one side of said pendulum and thereby frictionally retards the swinging of said pendulum and causes the same to come to a stop and to perform its functions more quickly than it would otherwise do, a pair of gage wires at the end of the elongated opening and coöperating with said index needle, oppositely disposed countersinks in said cut away sides, a pair of bearing plates securely held in said countersinks for supporting said pendulum, said beam also provided with a second circular opening, a second pendulum constituting a level mounted in said second opening and provided with a spindle with reduced bearing ends, and an indicating needle, a second pair of oppositely disposed countersinks in said cut away sides, a second pair of bearing plates securely held in said second pair of countersinks, and central alining perforations in said bearing plates, gage wires 24 and 25 located in said second opening and at right angles to said leveling edges whereby a double reading of said level is provided and the whole is adapted for either a plumb or a level, substantially as described.

In testimony whereof, I affix my signature, in presence of two witnesses.

JASPER N. WALKER.

Witnesses:
J. W. SAMUELS,
JNO. M. DODD.